Jan. 3, 1956 W. M. WALTON 2,729,267
MACHINE AND METHOD FOR MAKING EDGE EMBOSSED
PAPER ARTICLE AND PRODUCT THEREOF
Filed July 16, 1952 2 Sheets-Sheet 1

INVENTOR.
William M. Walton.
BY
Cromwell, Greist & Warden
Attys.

Jan. 3, 1956　　　W. M. WALTON　　　2,729,267
MACHINE AND METHOD FOR MAKING EDGE EMBOSSED
PAPER ARTICLE AND PRODUCT THEREOF
Filed July 16, 1952　　　　　　　　2 Sheets-Sheet 2
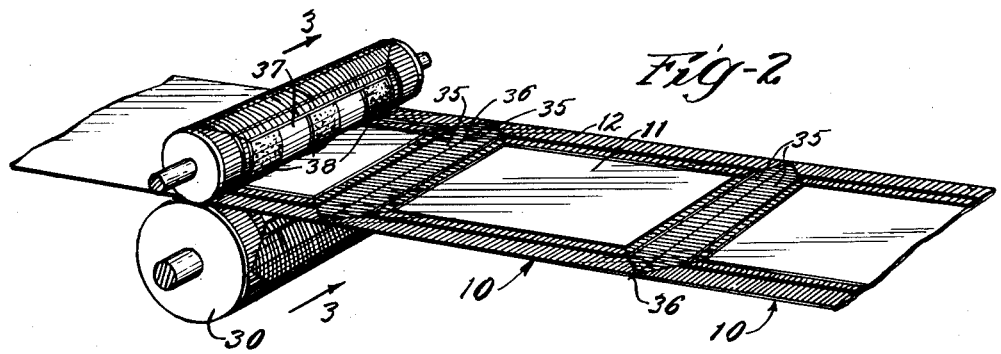
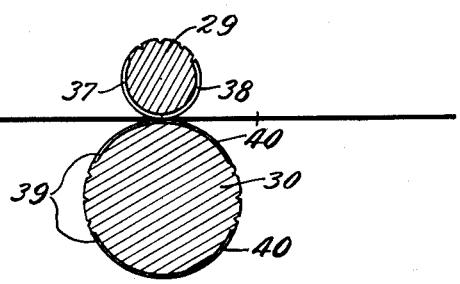
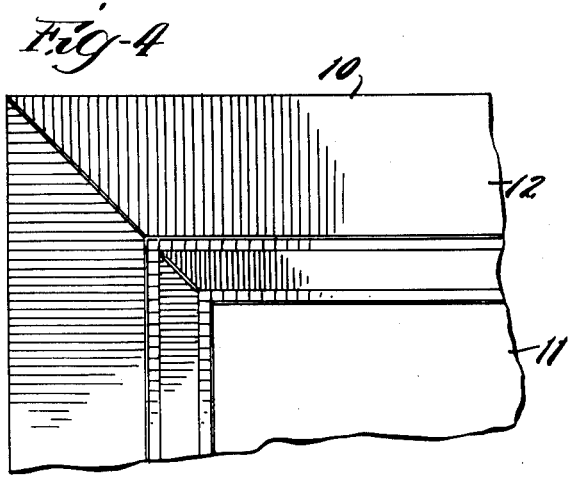
INVENTOR.
William M. Walton.
BY
Cromwell, Greist & Warden
Attys.

United States Patent Office 2,729,267
Patented Jan. 3, 1956

2,729,267

MACHINE AND METHOD FOR MAKING EDGE EMBOSSED PAPER ARTICLE AND PRODUCT THEREOF

William M. Walton, Oshkosh, Wis., assignor to Hoffmaster Company, Inc., Oshkosh, Wis., a corporation of Wisconsin Application July 16, 1952, Serial No. 299,151

6 Claims. (Cl. 154—1)

This invention relates to the manufacture of paper articles and is more particularly concerned with improvements in napkins, handkerchiefs or similar articles which are formed from a relatively light, flimsy tissue of soft texture and in the method and apparatus for forming the same.

It is a general object of the invention to provide an improved paper napkin or similar article which is characterized by a smooth center field surrounded by an embossed border of a highly decorative character, which extends to the margins of the napkin and which serves to secure together the plurality of plies of tissue material from which the napkin is formed.

It is a more specific object of the invention to provide a paper napkin or similar article which comprises a relatively large central area having a smooth surface devoid of any wrinkles or gathering and surrounded by a decorative or ornamental border which extends to the marginal edges of the article and which is of uniform width, the border being formed by passing stock material between embossing rolls and impressing a design along the margins of the material whereby the article is formed without any side edge trimming being required.

It is a further object of the invention to provide a method and apparatus or machine for fabricating, from a plurality of sheets of tissue material, paper articles, such as napkins, which are characterized by a smooth central area and a surrounding embossed margin of substantial width, by passing the material betwen pressure or embossing rolls in such a manner that complete control is maintained across the width of and along the length of the material to prevent any wrinkling of the material or any imperfections due to the tendency of the material to pile up in front of the rolls.

It is a further object of the invention to provide a method of manufacturing paper napkins or similar articles from a tissue material in which a continuous web of the tissue material or a multiplicity of webs in superimposed relation are fed progressively betwen a pair of pressure rolls one of which is suitably indented on its face to provide a smooth unembossed area surrounded by a marginal embossed area of substantial width which extends to the edge of the web and which secures the web in face engaging relation, the embossing or pressure rolls being cut away to provide the unembossed area and having the cutaway portion filled in with a felt or similar material which lightly grips the tissue and maintains control of the movement of the web completely across and along the same thereby preventing stretching of the material at the sides and wrinkling in the center.

It is another object of the invention to provide in a method of forming paper napkins or similar articles from a plurality of sheets or webs of tissue, embossing rolls having the portion thereof corresponding to the center of the article cut away and filled in with a soft pliable material, such as felt, which lightly grips the center area of the tissue and maintains it at proper tension while it is passing between the rolls.

It is another object of the invention to provide a method of fabricating napkins or similar articles from a plurality of webs of tissue by continuously passing the webs in superimposed relation between a pair of embossing rolls with portions of either roll being cut away at the center to form a central area in the successive articles of smooth unwrinkled character, the cutaway portions of the roll being filled in with a felt or similar material to lightly grip the webs as they pass between the rolls and maintain equalized tension across and along the webs, and wherein the embossed articles are subsequently passed through a printing unit which is adapted to print a design in a uniform position, preeferably on the unembossed central areas of the articles thereby providing uniform location of the printed design in each successive unembossed area and proper registration when more than one color is employed in the printing operation.

These and other objects of the invention will be apparent from a consideration of the article and method and apparatus forming the same which are shown by way of illustration in the accompanying drawings, wherein:

Fig. 2 is a diagrammatic perspective view showing the manner of embossing or impressing the marginal area of the material;

Fig. 3 is a section taken through the embossing rolls, to an enlarged scale; and Fig. 4 is a fragmentary elevation of an individual article showing the edge contour and a corner thereof.

Figure 1:
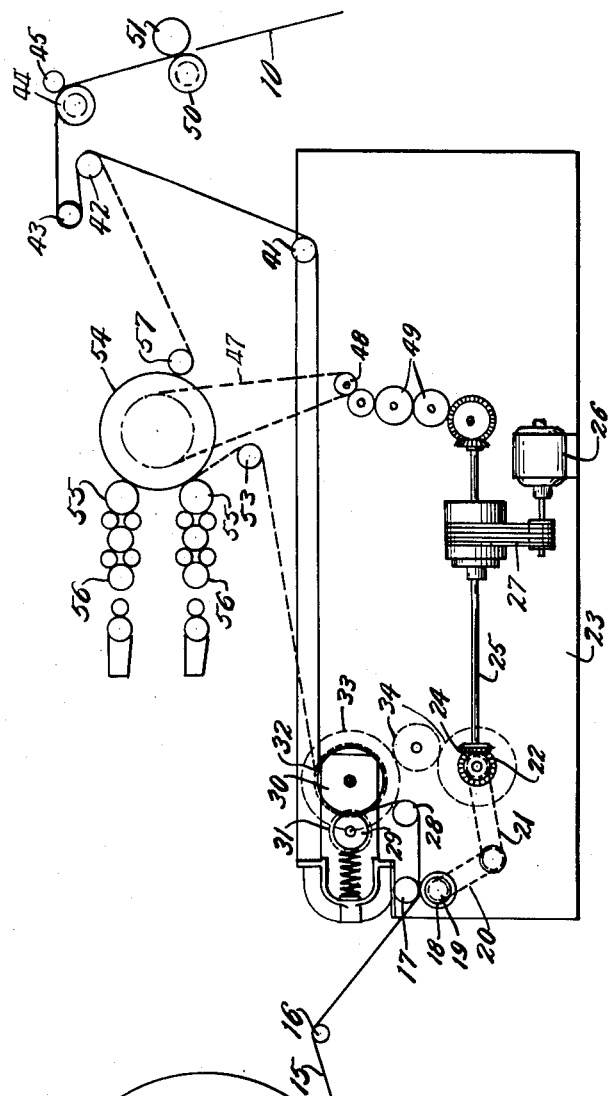
Fig. 1 is an elevation, largely diagrammatic, showing apparatus for forming and printing articles embodying therein the principal features of the invention.

Referring to Figs. 2 and 4, the principal features of the invention may be conveniently illustrated in a paper napkin 10 which comprises a center or field portion 11 surrounded by a decorative marginal portion 12 which completely encloses the field 11 and provides the article with a pleasing decorative appearance.

The napkin 10 may be formed of a single ply or sheet of stock material. However, it is preferably formed of a plurality of sheets or plies of the material which may be crepe, semi-crepe or plain surface tissue of a character similar to commonly used facial tissues. The stock may be supplied in a single thickness or in multiple webs superimposed upon each other but not secured in surface relation. Such stock is of uniform width when supplied in rolls but is of a soft, rather flimsy nature and cannot be pulled from the roll with any substantial tension without distortion of the side edges of the material. Consequently, in the manufacture of paper napkins and similar articles where a plurality of webs of material are employed considerable difficulty has been experienced in the feeding of the material to the embossing rolls. The flimsy nature of the material causes it to respond to uneven tension in feeding by stretching or wrinkling across its width and along its length when the material is of any substantial width such as required for the production of articles of the character here involved.

In the method, as illustrated particularly in Fig. 1, a roll of stock material 15, which may be of one or more thicknesses, is fed over an idler roller 16 to a pair of feed or pull rollers 17 and 18 which are spring-tensioned and driven by means of a sprocket 19 and connected drive chains 20, 21 from a drive shaft 22, or by any similar drive arrangement. The roll of stock 15 and idler roller 16 are supported on a suitable frame (not shown) while the pull rollers 17, 18, drive shaft 22 and other elements of the apparatus are supported on a frame indicated at 23. The drive shaft 22 is connected by cooperating bevel gears 24 with a power shaft 25 which is driven from motor 26 by belt drive 27.

From the feed rollers 17 and 18, which grip the material 15 and deliver it from the stock roll with a uniform tension across and along the web, the material passes around an idler roll 28 and between a pair of embossing rolls 29 and 30, which are suitably mounted on the frame 23. The rolls 29 and 30 are connected in driving relation by gears 31 and 32. Gear 33 on the supporting shaft for roll 30 and connecting gears 34 provide for driving the roll 30 from the shaft 22. The embossing rolls 29 and 30 are rotated by gears 31 and 32 so that they travel at the same linear speed. The roll 29, which is engraved in steel, or which carries suitable embossing dies, is illustrated as approximately half the size of the back-up roll 30 so that with one revolution of the latter roll two complete napkins are embossed.

The embossing rolls 29 and 30 carry cooperating patterns, roll 29 being engraved on the surface areas adjacent its ends to provide the marginal decorative border 12 (Fig. 2) on the material and a transverse embossed area, indicated at 35, to provide two marginal areas between the successive napkins 10, the napkins 10 being adapted to be severed from each other along the lines indicated at 36. The central area of the roll 29 which corresponds to the unembossed center 11 of napkin 10 is relieved or cut away at 37 (Fig. 3), and this central area 37 is provided with a plurality of transversely spaced strips 38 of felt, soft rubber or similar material which is adapted to lightly engage the center portions of the tissue web and to lightly iron the same. The cooperating roll 30 is cut away at the center in two areas 39, which are also filled in with corresponding cooperating strips 40 of felt or similar material. The tissue web is, of course, gripped between the strips 38 and 40 and the tension in the tissue is held uniform across and along the relieved or cutaway areas and the engraved marginal areas of the roll. The relieved areas 37 and 39 of the embossing rolls 29 and 30 may be covered with any desired arrangement of the felt material, sufficient of the material being used to keep the unembossed areas of the tissue flattened out and free of wrinkles.

The exact nature of the material which is employed to fill in the relieved areas 37 and 39 of the rolls 29 and 30 is not important so long as it functions to lightly grip and iron the unembossed portions of the tissue web which passes between the same with sufficient engagement or frictional hold on the web material to maintain the tension of the same evenly across and along the rolls, so that any tendency of the web to pile up ahead of the rolls or to stretch unevenly due to the rolling effect in the embossed portions of the rolls, which engage the web with substantial pressure, is relieved or overcome. In order to obtain a uniform, marginal area on each side and to maintain a uniform width of the entire napkin without any wrinkling or buckling of the center portion of the material, control of the entire web across its width is maintained by the filled in center areas of the rolls. If desired, only one of the embossing rolls 29 and 30 need be relieved at the center area and provided with the soft flexible material. The other roll may be provided with a smooth surface and satisfactory operation or control of the web across the entire width may still be obtained.

If no other decorative feature is desired on the napkins the web passes from the embossing rolls 29 and 30 around idler rolls 41, 42 and 43 and between a pair of pull rolls 44, 45. Rolls 44, 45 may be driven by means of a suitable gear train or other conventional driving connection with the power shaft 25 (not shown). From the pull rolls 44, 45 which maintain uniform tension on the traveling material the web passes to a pair of cut-off rolls 50, 51 and from there to a conventional folder.

When it is desired to provide a printed design or other decoration, particularly in the unembossed central area 11 of the napkin 10, the web is passed from the embossing rolls 29 and 30 to the idler roll 53 and thence around a platen roll 54 which has arranged around its surface one or more printing rollers 55 and accompanying inking mechanisms 56 of conventional character. The printing rollers and their associated mechanism may be connected by a chain 47 in driving relation with a secondary drive shaft 48 which is connected by gear train 49 with the power shaft 25. From the printing rolls 54, 55 the material passes beneath an idler 57 and to the idlers 42, 43 and pull rolls 44, 45 which maintain the tension in the web required for successfully printing the same. With the web under constant and uniform tension it is possible to time the printing operation so that a design is applied by letter press printing to the desired area in a uniform manner. When a multicolor design is printed registry is obtained by reason of the uniform tension maintained in the web.

A smooth unwrinkled napkin may be obtained with some embossing in the center field so long as control of the web across its width and along its length is maintained. Such control may be maintained by use of the relieved areas in the center field portion with sparse embossing, the sparse designs contributing to the control exercised over the web. The use of the felts may be eliminated under certain conditions where the sparse center field design is used. By adjusting the guide roller 28 to increase the wrap-around of the web on the back-up roller 30, more complete control of the web may be obtained by keeping more of the surface in engagement with the surface of the back-up roller 30 during the embossing operation.

I claim:

1. In apparatus for fabricating from a plurality of plies of relatively thin flimsy cellulosic tissue materials articles secured together by means of embossed marginal areas of substantial width which surround and completely enclose an unembossed central area, a pair of embossing rolls, said embossing rolls having edge embossing areas thereon extending along the end edges and said embossing rolls having circumferentially spaced transversely extending edge embossing areas whereby to provide in the articles said embossed marginal areas and unembossed areas surrounded by said embossed areas, said embossing rolls being cut away in the areas surrounded by said edge embossing areas and said cut away areas being filled in with strips of resilient material which lightly grip the tissue therebetween as it passes between said embossing rolls and means cooperating with said rolls to advance the webs under controlled tension whereby a central area is provided in the articles which is substantially smooth and free of wrinkles.

2. In a machine for forming paper articles from a plurality of webs of relatively thin flimsy cellulosic tissue material, a pair of embossing rolls having embossing areas thereon arranged to provide at intervals crosswise of the webs and along the untrimmed marginal side edges of the webs substantial embossed border forming areas for the articles which embossed areas are of uniform width, said rolls having portions cut away in the center forming areas between the edge embossing areas, resilient elements in the cut away areas of said rolls to lightly grip the webs and provide uniform controlled tension in the webs, and feed rolls for delivering the webs to the embossing rolls, said feed rolls being adjustable to deliver the webs under uniform tension and to cooperate with the embossing rolls to maintain uniform tension in the web as it passes between said embossing rolls.

3. A method of forming paper articles from a plurality of webs of relatively thin cellulosic tissue material of predetermined width, which articles are characterized by a relatively smooth unwrinkled center field surrounded by an embossed border of substantial width, which method comprises advancing the webs in superimposed relation, subjecting border forming areas of substantial width and extending inwardly from the opposite marginal side edges of the superimposed webs to embossing elements to secure the webs together and to form embossed border areas of uniform width along the original margins of the webs and maintaining relatively light engagement with the webs in the areas forming the center fields of the articles by resiliently supporting said areas during the embossing to control the advance of the webs and thereby avoid uneven movement and consequent wrinkling of the material in said center field.

4. A method of forming paper articles from a plurality of webs of relatively thin flimsy cellulosic tissue material which comprises continuously advancing the webs of material in superimposed relation in a predetermined path, subjecting the webs while they are traveling to an embossing operation which provides at intervals crosswise of the webs and extending inwardly of the marginal side edges of the webs border forming areas of substantial width for the articles which border forming areas are of uniform width and surround a relatively large central area having the greater portion thereof unembossed, and controlling the advance of the webs during the embossing operation to maintain a substantially uniform tension across the webs by resiliently supporting the unembossed portions of said webs in said central areas and maintaining relatively light engagement with the webs in said central areas.

5. A tissue paper article characterized by a relatively smooth unwrinkled center field surrounded by an embossed border which article comprises a plurality of plies of relatively thin flimsy cellulosic tissue material of predetermined width which are arranged in superimposed relation and held togther by the embossing in said border, said border consisting of marginal areas of substantial width, which completely surround the center field forming area which is substantially free of embossing, said center field area being smooth and free of wrinkles, and the embossed marginal areas forming said border having a uniform width and embossment and extending inwardly from the original untrimmed marginal side edges of the tissue material.

6. A tissue paper article characterized by a relatively smooth unwrinkled center field surrounded by an embossed border which article comprises a plurality of superimposed and edge aligned web sections of relatively thin flimsy cellulosic tissue material of predetermined length and width, said sections being secured in laminated relation by embossing in areas of substantial width extending along the marginal edges thereof, said embossed marginal areas forming the border of the article and completely surrounding a center field forming area which has at least the major portion thereof free of embossing, said center field area being smooth and free of wrinkles, and said border forming embossed marginal areas being of uniform width and embossing and extending inwardly along opposite side edges of the article from the original untrimmed marginal side edges of the web sections.

References Cited in the file of this patent

UNITED STATES PATENTS

| | | |
|---|---|---|
| 690,822 | Avril | Jan. 7, 1902 |
| 1,902,032 | Horine | Mar. 21, 1933 |
| 1,929,924 | Jopson | Oct. 10, 1933 |
| 1,939,081 | Prager | Dec. 12, 1933 |
| 2,020,668 | Wandel | Nov. 12, 1935 |
| 2,181,435 | Loris | Nov. 28, 1939 |
| 2,639,660 | Sunderhauf et al. | May 26, 1953 |